United States Patent Office 3,006,864
Patented Oct. 31, 1961

3,006,864
PROCESS FOR PREPARING AN ATTRITION RESISTANT CATALYST OR CATALYST SUPPORT
Fred J. Buchmann, Baton Rouge, La., assignor to Esso Research and Engineering Company, a corporation of Delaware
No Drawing. Filed Aug. 18, 1955, Ser. No. 529,355
16 Claims. (Cl. 252—463)

The present invention relates to an improved catalyst and process for its preparation. It relates more particularly to an alumina catalyst base material suitable for hydroforming and the like.

In the prior art various compositions, including alumina per se and in combination with other materials, have been proposed as catalysts or catalyst bases for converting or upgrading hydrocarbons and other organic compounds. In particular, it has been suggested that alumina hydrosols, e.g. from aluminum alcoholate solutions, may be dried, preferably by spray drying, to form discrete particles useful as catalyst bases. These base materials may be impregnated or otherwise compounded with active catalytic components of various kinds. For example, they may be compounded with suitable amounts, say 2 to 20% by weight, of molybdena, or of cobalt molybdate for reforming or hydrofining use. They may be treated with small amounts of chloroplatinic acid, or of other salts of the platinum group metals, to incorporate 0.01 to 2% of noble metal constituent. These are very suitable for the catalytic treating of petroleum fractions to improve their octane ratings, to decrease their sulfur contents, and to perform numerous other desirable conversions. Such catalysts are useful in fluid bed and also in fixed bed conversions.

The present invention is based upon the discovery that the resistance to attrition of catalyst bases, and of catalysts of the type just described may be substantially improved by a new technique. Briefly, this technique involves a process for subjecting the catalyst to abrasive or grinding action to break up the more friable or frangible particles, selectively removing the latter and reprocessing them. This is continued until the catalyst particles are all, or substantially all, of suitable mechanical strength and have satisfactory resistance to attrition.

More particularly, an aluminum containing material, preferably an alcoholate prepared according to known methods, is converted to an alumina hydrosol in the presence of a suitable acid. Several acids, known in the art, may be used, such as acetic or hydrochloric acid. In the case of an aluminum alcoholate sufficient acid, preferably acetic acid, is added to the hydrolysis mixture to form the peptized hydrosol or the original alcoholic solution of aluminum alcoholate may be acidified before hydrolysis. In this case the following generalized reaction occurs:

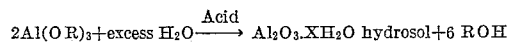

$$2Al(OR)_3 + \text{excess } H_2O \xrightarrow{\text{Acid}} Al_2O_3 \cdot XH_2O \text{ hydrosol} + 6 \text{ ROH}$$

After removing the alcohol by either decantation or distillation or both, the peptized hydrosol is spray dried by known methods to partially dehydrate the alumina.

The so-called Patrick sol method, by which the aluminum is solubilized in acetic acid, may also be used for preparing the alumina hydrosol or hydrous gel for spray drying, if desired. Ordinarily, the aluminum alcoholate method is preferred but in any case when the alumina, produced upon spray drying, can be repeptized to a hydrosol, i.e. can be homogeneously redispersed in water, the present method can be applied.

When this type of dispersion is spray dried, fine spherical particles of alumina, which still contain an average of 10 to 30 wt. percent volatile matter, are formed. These microspheres are generally calcined in the range of 1000 to 1100° F. for 1 to 6 hours and when prepared in this manner have substantial hardness, mechanical strength, and attrition resistance. The spray drying conditions should be so adjusted that most of the particles are larger than 15 to 25 microns average diameter. A minimum preferred diameter is at least 20 microns.

The spray dried material is next subjected to an air blast, or to mild mechanical ball milling or equivalent grinding or abrasive action. This should be sufficiently severe that about 5 to 40% of the product is broken down to particles of less than the minimum original size, e.g. less than 20 microns. The severity of grinding should be adjusted so that the desired attrition resistance in the unbroken particles is attained.

Thereafter, the broken fines are elutriated from the unbroken or larger particles. These fines contain sufficient acid so that they can be readily redispersed in water to reform a hydrosol. They are accordingly redispersed and may be spray dried separately or may be combined with additional portions of the original sol to produce more new particles.

The process is repeated, breaking up, elutriating and redispersing and spray-drying until the softer, more friable or frangible particles are substantially eliminated. The attrition-resistant product is now suitable for calcining and impregnation.

The product obtained by the process so far described is next impregnated with a suitable active catalyst, e.g. molybdic acid, chloroplatinic acid, etc. to incorporate the active component into it. The method of impregnating and calcining per se forms no part of the present invention. The alumina base, prepared as described above, usually contains considerable amounts of adsorbed water and volatile acids. Accordingly it may be desirable to remove part or most of these volatile constituents by calcining prior to impregnation. Further, after impregnation, the alumina based catalyst is calcined at a suitable temperature and for an appropriate period of time to reduce its water content and condition it for use, as is known in the art. The catalyst of this invention has excellent properties of attrition resistance.

The following specific example is illustrative of the present invention.

Aluminum alchoholate solution is prepared as described in U.S. Patent No. 2,636,865. Aluminum metal cubes about ½ inch in size are dissolved in a 50/50 mixture of mixed amyl alcohols and petroleum naphtha boiling in the range of 230°–350° F. About 0.001 part by weight of mercuric chloride per part by weight of aluminum is used to promote the reaction between the metal and the alcohol. It is necessary to heat the mixture to about 220° F. to initiate the reaction between the metal and the alcohol; but thereafter cooling is required to remove the heat of reaction. About 27 grams of aluminum are dissolved in each liter of alcohol-hydrocarbon mixture. Alumina hydrosol is prepared from the aluminum alcoholate solution according to U.S. Patent No. 2,656,321. Glacial acetic acid is added to aluminum alcoholate solution in the ratio of about 7.5 cc. of acetic acid per liter of alcoholate solution, and the mixture is at once hydrolyzed by rapidly mixing with twice its volume of water that has been heated to 180° F. The mixture is allowed to settle for about an hour and the upper, organic layer is decanted. The remaining alcohol and hydrocarbon are removed from the hydrosol by distillation. The resulting alumina hydrosol comprises about 3% alumina.

The alumina hydrosol as prepared above may be used as feed to a spray drier of any of the conventional commercial models for drying this type of material. The solids content of the hydrosol may be altered either by dilution or concentration, i.e. water removal by distillation. Spray drying can be accomplished at temperatures in the range of 215° F. to 300° F. average final temperature or higher. The hydrosol feed is introduced into the drying chamber through an appropriate number of nozzles having a clear inside diameter of about 0.050 to 0.100 inch. Pressure drop through the nozzles may be 50 pounds per square inch or higher. The alumina obtained in this manner is a white powder which, on close examination, consists mainly of small, hard spherical particles of about 25 to about 75 microns average diameter having an average volatile content of 15% or more. The powder is placed in a vessel and subjected to a high velocity jet of air having a jet velocity in the range of from about 200 feet per second to above supersonic velocities. The residence time in the attrition vessel is controlled so that from 5 to 40 weight percent of the alumina is broken up into particles finer than 20 microns. These are removed by elutriation. The elutriation may be conducted in the attrition vessel or in a separate vessel.

The fines removed amount to 5 to 40 wt. percent of the total powder. For redispersing to reconvert these fines to a hydrosol they are returned either to a fresh hydrosol or to an appropriate quantity of water to which it may be desirable to add additional acid. Redispersing is accomplished by the application of vigorous agitation; and heating may also aid in this process. In any event the hydrosol containing the redispersed solids and containing about 2 to 6 wt. percent total solids is spray dried in the same manner as the original hydrosol. The properties of the product from the second spray drying are the same as those from the original spray drying.

The alumina prepared in this manner can be used as the base for preparing numerous catalysts. From 2 to 20% by weight of the oxide of a metal in group VI of the periodic table, for example $MoO_3$, can be added or from 0.01 to 20% by weight of a metal in group VIII of the periodic table can be added. The catalysts thus formed are very suitable for the catalytic treating of petroleum fractions to improve their octane ratings, to decrease their sulfur contents and to perform numerous other desirable conversions.

What is claimed is:

1. A process for preparing an attrition resistant catalyst of the alumina base type which comprises preparing an aqueous acidic dispersion of an aluminum compound in the form of a hydrosol which is readily convertible to alumina on dehydration, spray drying said solution to produce dry highly attrition-resistant particles larger than about 15 to 25 microns, mixed with less attrition-resistant particles, subjecting all of said particles to an attrition action to reduce the less attrition-resistant particles to fines small than about 20 microns, elutriating the fines in water to form a second aqueous dispersion in the form of a hydrosol, removing coarser particles, redispersing said fines, and repeating the spray-drying, attrition, elutriating and redispersing steps until the less attrition-resistant particles are substantially eliminated.

2. A process according to claim 1 wherein the hydrosol of the aluminum compound is prepared by peptizing with acetic acid prior to spray-drying.

3. A process according to claim 1 wherein the hydrosol is prepared from aluminum alcoholate.

4. A process according to claim 1 wherein the attrition action is obtained by subjecting all particles to the action of a high velocity gas jet.

5. A process according to claim 1 wherein said elutriated fines are redispersed in a fresh aqueous acidic dispersion of the aluminum compound.

6. A process according to claim 1 wherein said elutriated fines are redispersed by mixing with water.

7. A process for preparing an attrition resistant alumina which comprises spray drying an alumina hydrosol to produce a mixture of dry highly attrition-resistant particles larger than about 15 to 25 microns and less attrition-resistant particles larger than about 15 to 25 microns, subjecting said mixture before calcination of dry spray dried particles to an attrition action to reduce not more than about 40% of the particles comprising the less attrition-resistant particles to fines smaller than about 20 microns, elutriating said fines, separating coarser particles of a size larger than about 15 to 25 microns and removing them from the process as product, forming another alumina hydrosol solution from said elutriated fines, then repeating said spray drying, attrition and elutriating steps and formation of alumina hydrosol solution including redispersed fines as long as the less attrition-resistant particles are formed.

8. A process according to claim 7 wherein said alumina hydrosol comprises an aqueous acidic solution and in which said elutriated fines contain sufficient acid to form additional alumina hydrosol upon agitation in water.

9. A process according to claim 7 wherein said elutriated fines are added to fresh alumina hydrosol and agitated to form alumina hydrosol.

10. A process for preparing an attrition-resistant alumina which comprises spray-drying an aqueous mixture containing an aluminum compound to dehydrate the mixture and form dry alumina particles larger than about 20 microns, some of which particles are highly attrition-resistant and others of which are less attrition-resistant, subjecting all of said spray-dried alumina particles containing about 10 to 30 weight percent of volatile matter to a mild grinding action to break down 5 to 40% of said dry alumina particles to particles less than about 20 microns in size, elutriating said alumina particles smaller than about 20 microns in size from the total ground mixture, separating coarser dry alumina particles of a size larger than about 20 microns and removing them from the process as a desired attrition-resistant alumina product, forming a second aqueous mixture containing an aluminum compound from said elutriated particles smaller than about 20 microns, then repeating the spray drying of said second aqueous mixture, grinding, elutriating steps and recovery of coarser highly attrition-resistant particles, and formation of an aqueous mixture containing an aluminum compound from elutriated particles smaller than about 20 microns as long as the less attrition-resistant particles are formed.

11. A process according to claim 10 wherein the aqueous mixture containing an aluminum compound comprises alumina hydrosol.

12. A process according to claim 10 wherein the removed coarser alumina particles larger than about 20 microns are calcined at a temperature of at least 1000° F. for 1 to 6 hours to produce highly attrition-resistant alumina particles.

13. A process according to claim 10 wherein said spray drying is done in a drying chamber at a temperature above about 215° F.

14. A process according to claim 10 wherein said mild grinding is done by a high velocity jet of gas.

15. A process according to claim 10 wherein said mild grinding is done by a high velocity jet of gas having a velocity from about 200 feet per second to above supersonic velocities.

16. A process according to claim 11 wherein the alumina hydrosol is in an acid solution.

References Cited in the file of this patent

UNITED STATES PATENTS

| | | |
|---|---|---|
| 2,406,420 | Weiser et al. | Aug. 27, 1946 |
| 2,487,065 | Milliken | Nov. 8, 1949 |
| 2,492,167 | Marisic et al. | Dec. 27, 1949 |
| 2,555,282 | Ashley | May 29, 1951 |
| 2,636,865 | Kimberlin et al. | Apr. 28, 1953 |
| 2,644,799 | Robinson | July 7, 1953 |
| 2,762,783 | Kimberlin et al. | Sept. 11, 1956 |
| 2,930,764 | Steel | Mar. 29, 1960 |